US010605117B2

(12) United States Patent
Wang et al.

(10) Patent No.: US 10,605,117 B2
(45) Date of Patent: *Mar. 31, 2020

(54) FAN PLATFORM FOR A GAS TURBINE ENGINE

(71) Applicant: General Electric Company, Schenectady, NY (US)

(72) Inventors: Mingchao Wang, Miamisburg, OH (US); Gerald Alexander Pauley, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 788 days.

This patent is subject to a terminal disclaimer.

(21) Appl. No.: 14/877,990

(22) Filed: Oct. 8, 2015

(65) Prior Publication Data

US 2017/0101876 A1 Apr. 13, 2017

(51) Int. Cl.
*F01D 25/00* (2006.01)
*F01D 11/00* (2006.01)
*B29D 99/00* (2010.01)
*B29C 70/42* (2006.01)

(52) U.S. Cl.
CPC ............ *F01D 25/005* (2013.01); *B29C 70/42* (2013.01); *B29D 99/0025* (2013.01); *F01D 11/008* (2013.01); *F05D 2220/36* (2013.01); *F05D 2300/50212* (2013.01); *F05D 2300/603* (2013.01); *Y02T 50/672* (2013.01); *Y10T 29/4998* (2015.01); *Y10T 29/49337* (2015.01); (Continued)

(58) Field of Classification Search
CPC .. F01D 11/008; F01D 25/005; F05D 2220/36; F05D 2300/603; F05D 2300/50212; Y02T 50/672; B29D 99/0025; Y10T 29/49337; Y10T 29/4998; Y10T 29/49982; Y10T 29/49801; B29C 70/42; F05B 2280/50032
USPC ............ 416/191, 192, 193 R, 193 A, 196 R; 264/258
See application file for complete search history.

(56) References Cited

U.S. PATENT DOCUMENTS 4,232,996 A 11/1980 Stoffer
4,810,570 A * 3/1989 Rutten ....................... C08J 9/06
264/45.5

(Continued)

FOREIGN PATENT DOCUMENTS

EP 1046785 A2 10/2000
EP 1557538 A2 7/2005
(Continued)

*Primary Examiner* — Christopher Verdier
(74) *Attorney, Agent, or Firm* — Dority & Manning, P.A.

(57) ABSTRACT

A gas turbine including a fan platform positioned between adjacent fan blades of a fan of the gas turbine engine is provided. The fan platform defines an outer surface that at least partially defines an inner flowpath boundary of the fan. Additionally, the fan platform includes at least two components attached to one another. At least one of the components of the fan platform defines an enclosed void. An insert is positioned within the enclosed void formed of a material defining a relatively low Young's modulus. The insert may prevent resin from filling the enclosed void during assembly/manufacture of the fan platform, while also reducing a weight of the fan platform and an amount of stress on the fan platform.

16 Claims, 8 Drawing Sheets

(52) U.S. Cl.
CPC .... *Y10T 29/49801* (2015.01); *Y10T 29/49982* (2015.01)

(56) References Cited

U.S. PATENT DOCUMENTS

| | | | | |
|---|---|---|---|---|
| 5,281,096 | A | * | 1/1994 | Harris .................. F01D 11/008 416/193 A |
| 5,421,704 | A | | 6/1995 | Carletti et al. |
| 6,033,328 | A | * | 3/2000 | Bellefleur .............. A63B 59/70 473/560 |
| 6,217,283 | B1 | | 4/2001 | Ravenhall et al. |
| 6,447,250 | B1 | | 9/2002 | Corrigan et al. |
| 6,827,556 | B2 | | 12/2004 | Simon |
| 7,198,472 | B2 | | 4/2007 | McMillan et al. |
| 7,416,401 | B2 | | 8/2008 | Albright et al. |
| 8,303,258 | B2 | | 11/2012 | Aubin |
| 8,616,849 | B2 | | 12/2013 | Menheere et al. |
| 2008/0095614 | A1 | | 4/2008 | Aubin |
| 2009/0252612 | A1 | | 10/2009 | Ahmad et al. |
| 2009/0269203 | A1 | * | 10/2009 | Care ................... F01D 11/008 416/221 |
| 2012/0009404 | A1 | * | 1/2012 | Heb ......................... B32B 7/02 428/218 |
| 2012/0263595 | A1 | * | 10/2012 | Evans .................. F01D 5/3092 416/189 |
| 2012/0263596 | A1 | * | 10/2012 | Evans ...................... F01D 5/28 416/193 A |
| 2012/0295993 | A1 | * | 11/2012 | Wool .................... C08J 9/0023 521/50.5 |
| 2013/0266447 | A1 | * | 10/2013 | Evans .................... F01D 5/225 416/191 |
| 2014/0186187 | A1 | | 7/2014 | Lamboy et al. |
| 2014/0322485 | A1 | | 10/2014 | Marchal et al. |
| 2016/0115794 | A1 | * | 4/2016 | Thomas .................. B29C 70/48 416/213 R |
| 2017/0101878 | A1 | * | 4/2017 | Wang ..................... F01D 9/041 |

FOREIGN PATENT DOCUMENTS

| | | |
|---|---|---|
| EP | 1916385 A1 | 4/2008 |
| WO | WO 2013/104853 A2 | 7/2013 |
| WO | WO 2014/149366 A1 | 9/2014 |

\* cited by examiner ated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FAN PLATFORM FOR A GAS TURBINE ENGINE

FIELD OF THE INVENTION

The present subject matter relates generally to a fan platform for a gas turbine engine, or more particularly to an insert in a fan platform for a gas turbine engine.

BACKGROUND OF THE INVENTION

A gas turbine engine generally includes a fan and a core arranged in flow communication with one another. The core of the gas turbine engine generally includes, in serial flow order, a compressor section, a combustion section, a turbine section, and an exhaust section. The fan includes a plurality of circumferentially spaced fan blades extending radially outward from a rotor disk. Each of the plurality of fan blades generally includes an airfoil portion and a dovetail root portion. The dovetail root portion may be slidably received in a complementary slot formed in the rotor disk to attach the fan blade to the rotor disk. At least a portion of the air flowing over the fan blades may be provided to the core of the gas turbine engine.

During operation of the gas turbine engine, ambient air is channelled between adjacent rotating fan blades and pressurized thereby, which may generate thrust for powering an aircraft in flight. Fan platforms provide a radially inner flowpath boundary for the airflow channel between the plurality of fan blades. The fan platforms are located between adjacent fan blades, near the rotor disk. At least certain fan assemblies have been developed using discrete platforms, independently joined to the rotor disk between adjacent fan blades. These separate platforms must have suitable strength for accommodating both centrifugal loads and impact loads, such as those due to a bird strike, during operation.

In at least certain embodiments, the discrete platforms may include components formed of various materials, attached using, e.g., a resin injection method. In order to limit an amount of resin seeping into any voids and to strengthen the fan platform, carbon fiber reinforced polymer inserts can be positioned in any such void. However, carbon fiber reinforced polymer inserts can be heavy and labor-intensive to form accurately. Accordingly, a fan platform having one or more inserts positioned within interior voids that are lighter and less labor-intensive to form would be useful. Specifically, a fan platform having one or more inserts within the interior voids that are lighter, but may still maintain a desired shape would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine is provided. The gas turbine engine includes a fan having a plurality of fan blades, and a fan platform positioned between adjacent fan blades of the plurality of fan blades. The fan platform defines an outer surface, the outer surface at least partially defining an inner flowpath boundary of the fan. The fan platform includes a first component, and a second component. The first component is attached to the second component. At least one of the first component or second component at least partially defines an enclosed void. The fan platform also includes an insert positioned in the enclosed void, the insert formed of a material defining a Young's modulus less than about 125 thousand pounds per square inch.

In another exemplary embodiment of the present disclosure, a fan platform for positioning between adjacent fan blades of a gas turbine engine fan is provided. The fan platform includes a first component and a second component. The first component is attached to the second component. At least one of the first component or the second component at least partially defines an enclosed void. The fan platform also includes an insert positioned in the enclosed void, the insert formed of a material defining a Young's modulus less than about 125 thousand pounds per square inch.

In an exemplary aspect of the present disclosure, a method is provided for manufacturing a fan platform for positioning between adjacent fan blades of a gas turbine engine fan. The method includes assembling two or more components of the fan platform to define an enclosed void with an insert positioned therein. The insert is formed of a material defining a Young's modulus less than about 125 thousand pounds per square inch. The method also includes wrapping at least a portion of the two or more components of the fan platform at least partially in a fabric material, and resin injecting the fabric material to attach the two or more components.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
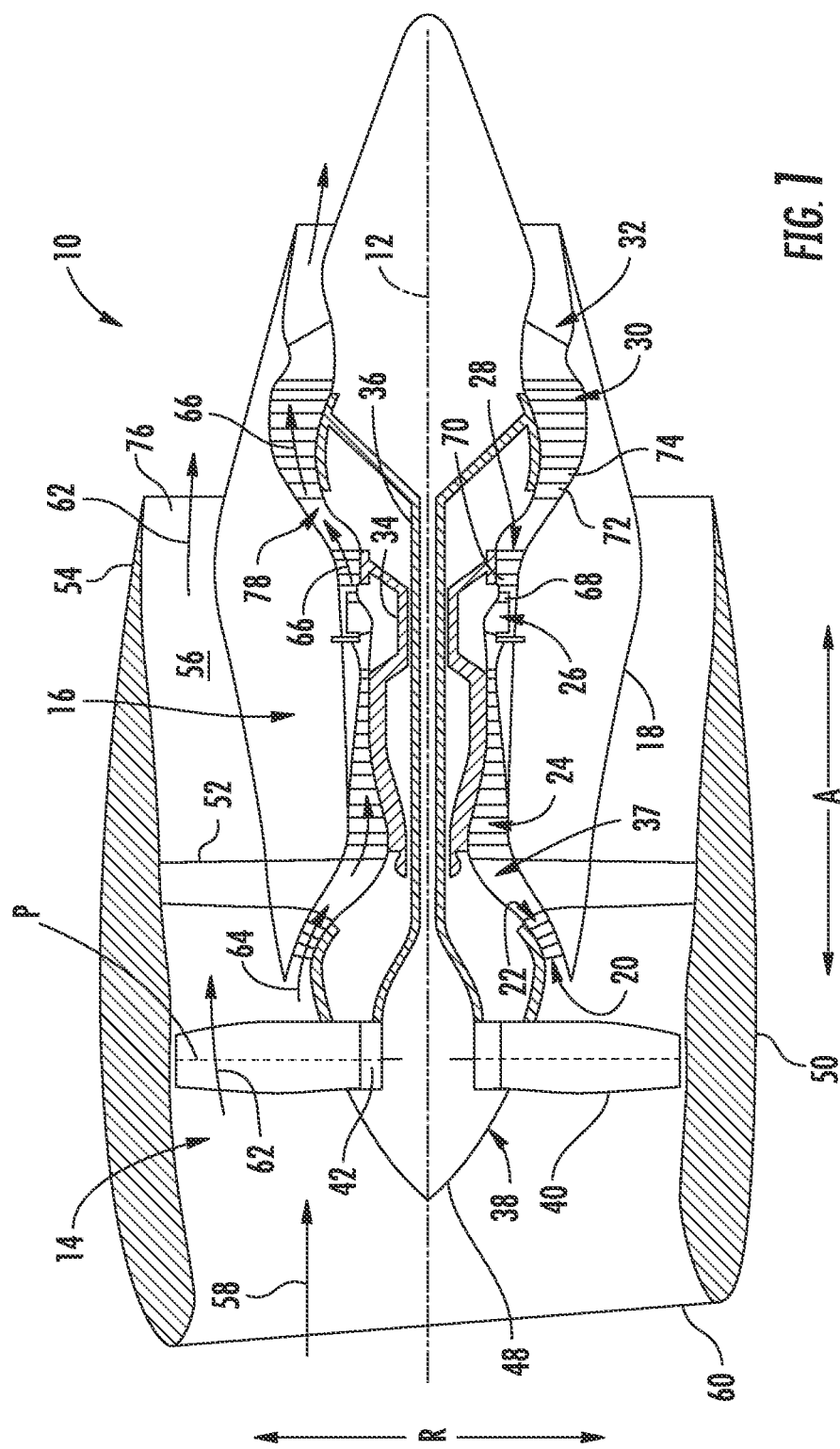
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, referred to herein as "turbofan engine 10." As shown in FIG. 1, the turbofan engine 10 defines an axial direction A (extending parallel to a longitudinal centerline 12 provided for reference), a radial direction R, and a circumferential direction C (see FIG. 3). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a fan 38 having a plurality of fan blades 40 coupled to a rotor disk 42 in a spaced apart manner. As depicted, the fan blades 40 extend outwardly from rotor disk 42 generally along the radial direction R. The disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan 38 nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the fan 38 may be configured as a variable pitch fan including, e.g., a suitable actuation assembly for rotating the plurality of fan blades about respective pitch axes P. It should also be appreciated, that in still other exemplary embodiments, aspects of the present disclosure may be incorporated into any other suitable gas turbine engine. For example, in other exemplary embodiments, aspects of the present disclosure may be incorporated into, e.g., turboprop engine.

Figure 2:
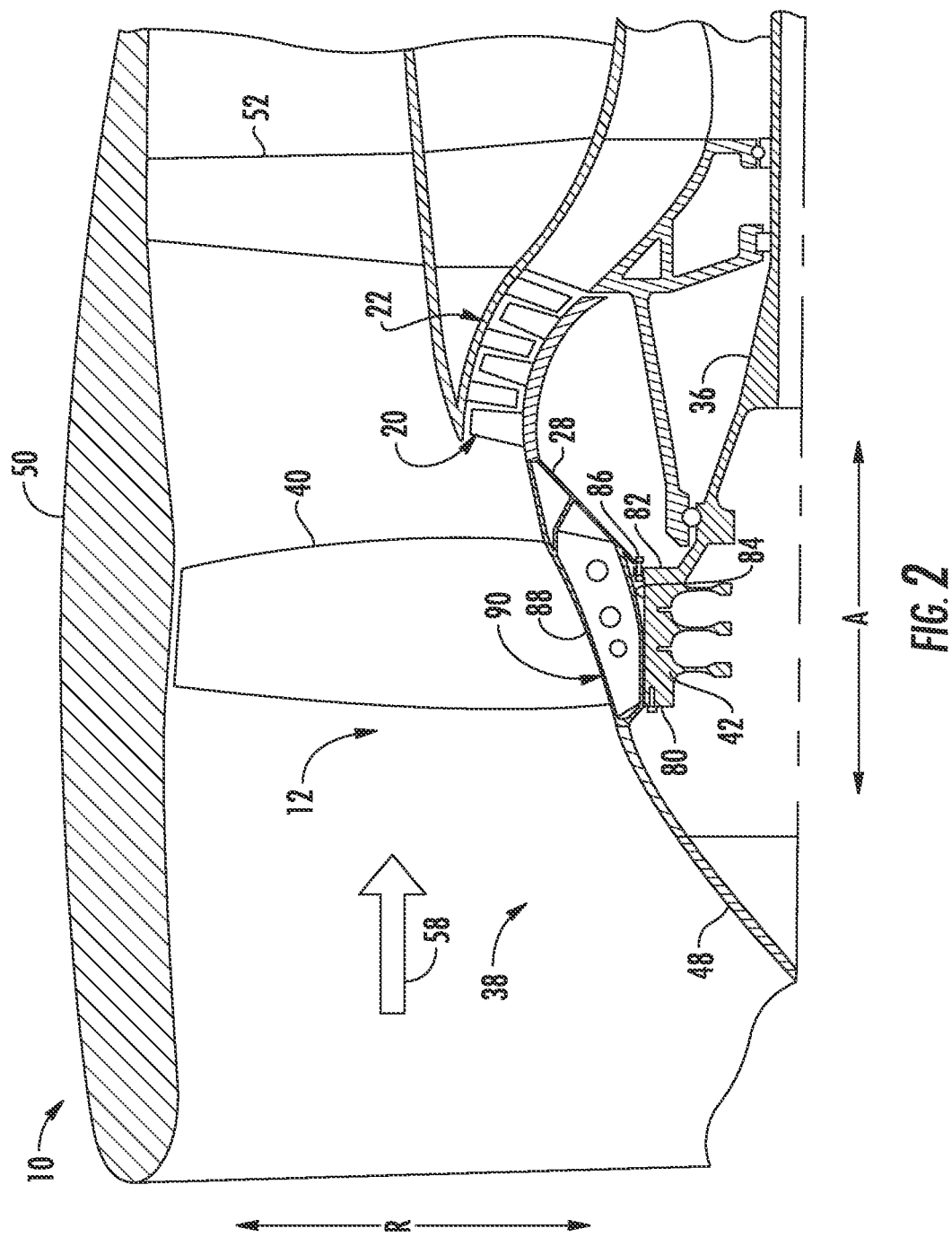
FIG. 2 is a schematic, cross-sectional view of a forward end of the exemplary gas turbine engine of FIG. 1.

Referring now to FIG. 2, a close-up, schematic view is provided of the exemplary turbofan engine 10 of FIG. 1. As shown, the fan 38 includes the rotor disk 42 and the plurality of circumferentially spaced fan blades 40 (only one shown in FIG. 2) extending radially outwardly from the rotor disk 42. The rotor disk 42 includes axially spaced apart forward and aft sides 80 and 82, respectively, and a radially outer surface 84 extending therebetween.

For the embodiment depicted, the LP shaft 36 is suitably fixedly joined directly to the rotor disk aft side 82 by a plurality of bolts 86. However, in other exemplary embodiments, the turbofan engine 10 may include a geared fan configuration, such that a gearbox is disposed between the LP shaft 36 and the fan 38. For example, in such an exemplary embodiment, the LP shaft 36 may be fixedly joined to an input shaft, the input shaft coupled to the gearbox, and the gearbox also mechanically coupled to a fan shaft for driving the fan 38.

Referring still to FIG. 2, the turbofan engine 10 additionally includes a plurality of discrete platforms 88 (only one shown in FIG. 2) that are provided between each pair of adjacent fan blades 40 of the plurality of fan blades 40. Specifically, each platform 88 is disposed between a respective pair of adjacent fan blades 40 and radially outward from the rotor disk 42. Each of the platforms 88 has a radially outer surface 90 extending between the respective adjacent fan blades 40 so as to collectively define an inner flowpath boundary for channeling air 58 between the fan blades 40. Thus, the platforms 88 function to maintain the engine flowpath definition between the rotatable front hub 48 and the LP compressor 22.

Figure 3:
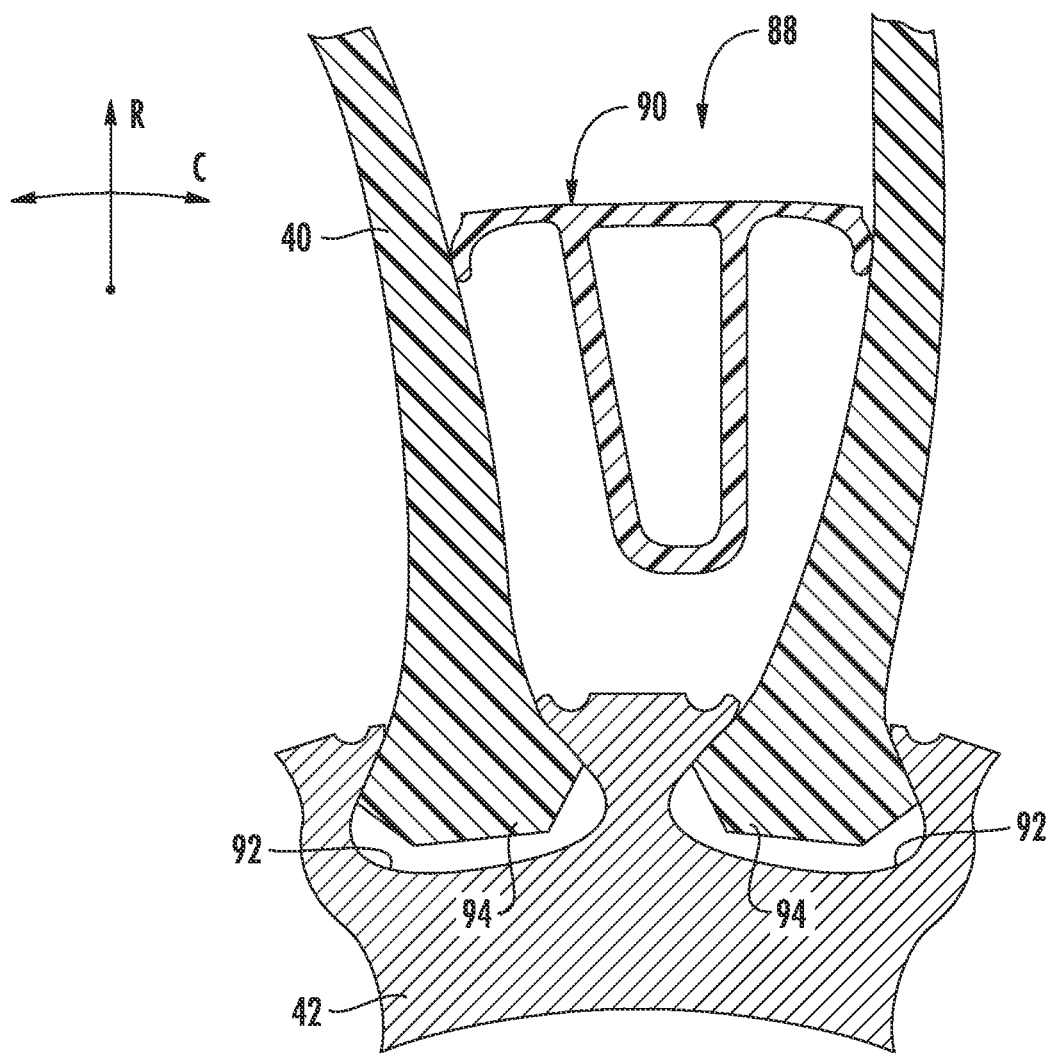
FIG. 3 is a close-up, schematic, cross-sectional view along a radial direction of a fan of the exemplary turbofan engine of FIG. 1.

Referring now briefly to FIG. 3, a simplified, cross-sectional view of a pair of adjacent fan blades 40, a corresponding portion of the rotor disk 42, and a fan platform 88 are depicted schematically. As shown, the rotor disk 42 includes a plurality of circumferentially spaced apart axial dovetail slots 92 which extend radially inwardly from the disk outer surface 84, with the disk portions between the dovetails slots 92 also being known as dovetail posts. Each of the fan blades 40 includes an integral root section 94 that is in the form of a complementary axial-entry dovetail. The dovetail root sections 94 are disposed in respective ones of the dovetail slots 92 for attaching the fan blades 40 to the rotor disk 42. The dovetail slots 92 and root sections 94 are designed so as to permit limited rotation of the root section 94 along the circumferential direction C, about the axial direction A, within the dovetail slot 92 in response to, e.g., an extreme force exerted on the fan blade 40. It should be appreciated, however, that in other exemplary embodiments, each of the plurality of fan blades 40 may alternatively be attached to the disk 42 in any other suitable manner. For example, as discussed above, in other exemplary embodiments, the fan 38 may be configured as a variable pitch fan. Accordingly, in such an exemplary embodiment the plurality of fan blades 40 may each be rotatably attached to the disk about respective pitch axes.

Figure 4:
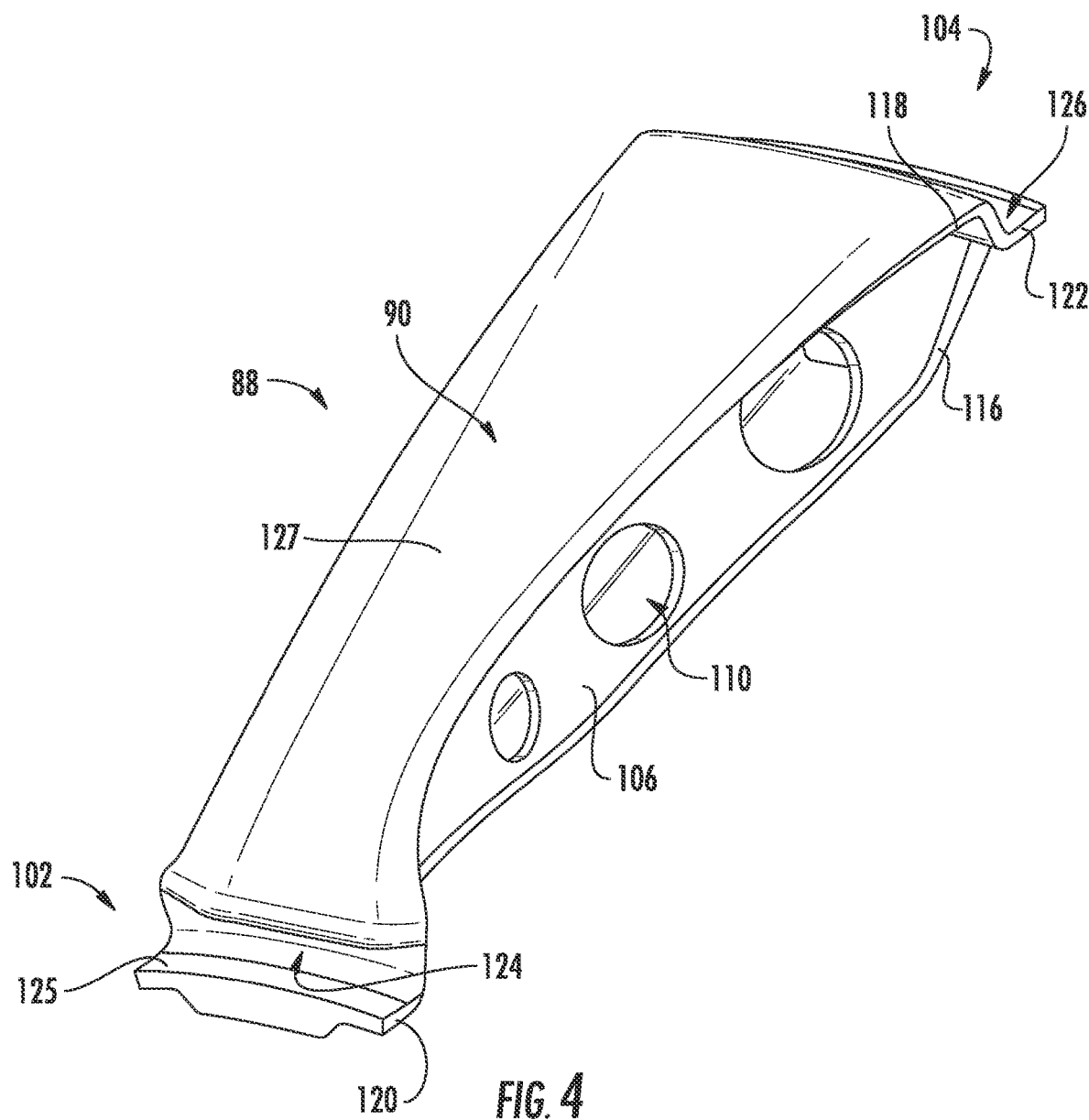
FIG. 4 is a perspective view of a fan platform in accordance with an exemplary embodiment of the present disclosure.
Figure 5:
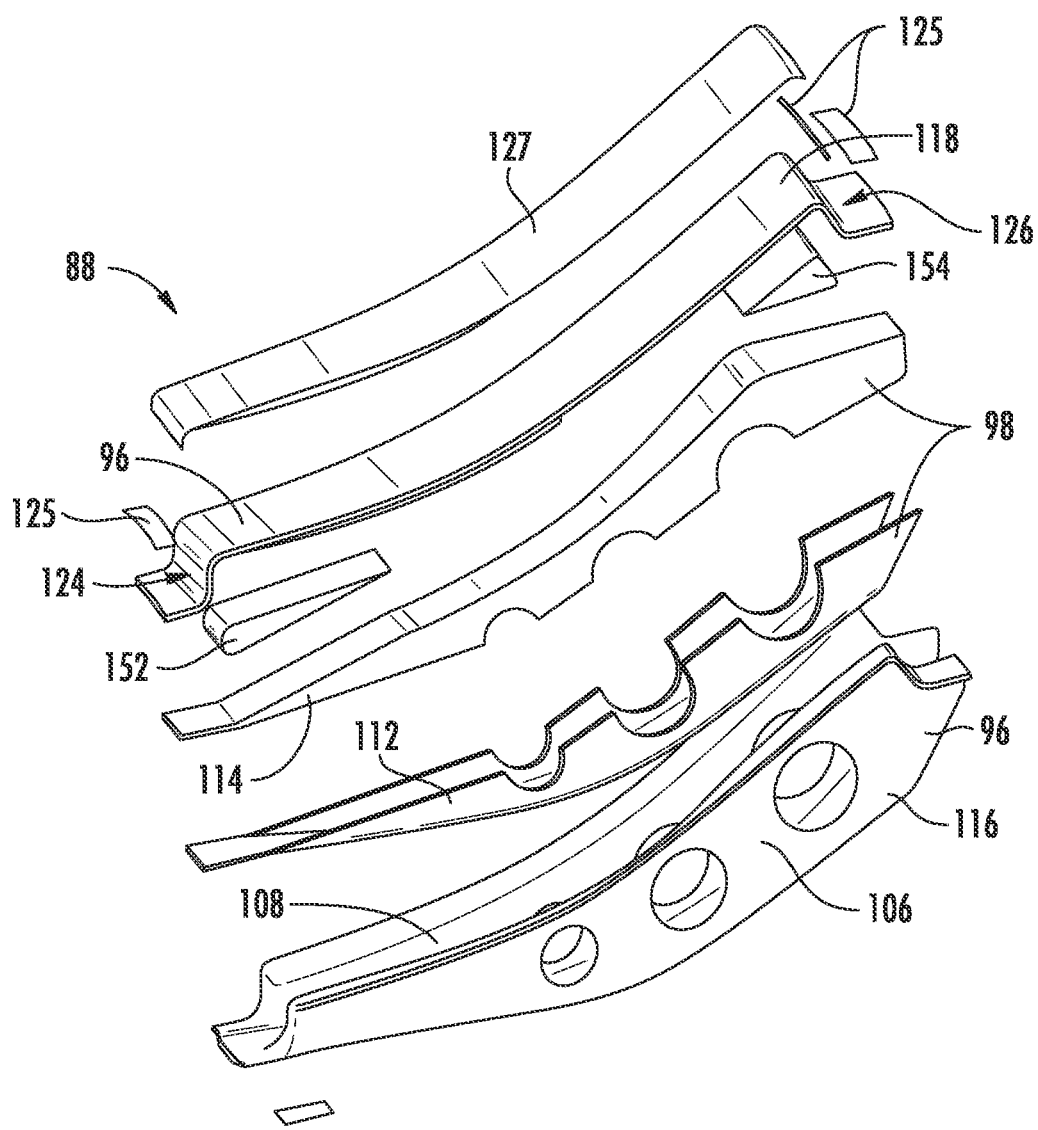
FIG. 5 is a perspective, exploded view of the exemplary fan platform of FIG. 4.
Figure 6:
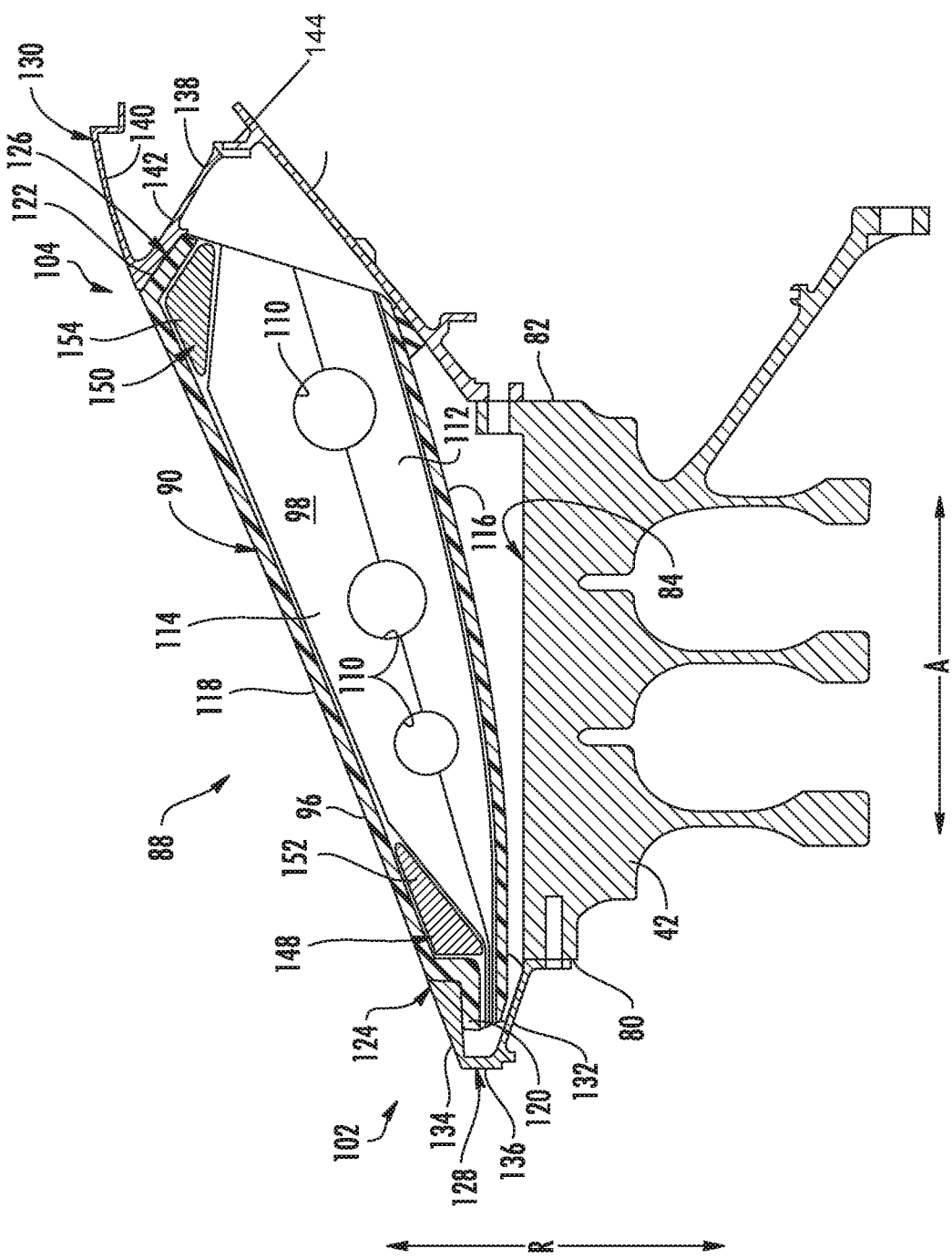
FIG. 6 is a close-up, schematic, cross-sectional view along an axial direction of the exemplary fan platform of FIG. 4 installed in the exemplary turbofan engine of FIG. 1.

Referring now to FIGS. 4 through 6, various views of a single fan platform 88 are provided. Specifically, FIG. 4 provides a perspective, assembled view of the fan platform 88; FIG. 5 provides an exploded perspective view of the exemplary fan platform 88; and FIG. 6 provides a side, cross-sectional view of the exemplary fan platform 88 installed in the turbofan engine 10.

The platform 88 generally includes a shell 96 and a structural body 98, which are joined together in a substantially T-shaped configuration in cross-section (see FIG. 3). The shell 96 at least partially defines the radially outer surface 90. As best seen in FIG. 6, the platform 88 has a forward end 102 disposed near the disk forward side 80, and an axially opposite aft end 104 disposed near the disk aft side 82. The body 98 contributes to the bulk of the platform's 88 mass and consequently may provide the platform 88 with an amount of strength necessary to carry its centrifugal load.

To reduce the overall weight of the platform 88 while maintaining suitable strength thereof, the shell 96 may be made from a non-metal, composite material. For example, one suitable composite material would be graphite fibers embedded in an epoxy resin. Alternatively, however, the composite material could be any suitable thermoset or thermoplastic polymer. Furthermore, the structural body 98, which by contrast may be formed of a metal material, is configured as a hollow body having a first side wall 106 and a second side wall 108. To further reduce weight, a number of weight relief holes 110, are formed in each side wall 106, 108 of the structural body 98, as well as in the shell 96.

Specifically, for the embodiment depicted, the body 98 is formed of an inner body member 112 and a complementary outer body member 114. Similarly, the shell 96 is formed of an inner shell member 116 and a complementary outer shell member 118. The inner and outer body members 112, 114 may be placed together and positioned within the inner shell member 116. The outer shell member 118 may then be placed atop the inner shell member 116, enclosing the inner and outer body members 112, 114 therein.

Moreover, the body 98 and shell 96 of the platform 88 together form a forward mounting flange 120 extending axially outward from the forward end 102 and an aft mounting flange 122 extending axially outward from the aft end 104. The forward and aft mounting flanges 120, 122 are configured so as to define forward and aft abutment surfaces 124 and 126, respectively. Each abutment surface 124, 126 has a wear strip 125, made of a wear resistant material. Similarly, a wear strip 127 is positioned on the outer shell member 118. The wear strip 127 defines, with the outer shell member 118, the radially outer surface 90.

Referring particularly to FIG. 6, the platform 88 is retained by a forward support ring 128 and an aft support ring 130. The forward support ring 128 is an annular member that is substantially C-shaped in cross-section and includes a radially inner segment 132, a radially outer segment 134, and a middle portion 136 joining the two segments 132, 134. The inner segment 132 is fixedly joined at its distal end to the forward side 80 of the rotor disk 42 by a plurality of bolts, for example. The radially outer segment 134 overlaps the forward mounting flange 120 and engages the abutment surface 124, thereby retaining the forward end 102 of the platform 88. The middle portion 136 of the forward support ring 128 abuts the aft end of the rotatable hub 48. Optionally, the forward support ring 128 may be an integral portion of the otherwise conventional rotatable hub 48.

The aft support ring 130 is an annular member that is substantially V-shaped in cross-section and includes a radially inner segment 138 and a radially outer segment 140 joined together at an intersection that defines an abutment 142. The inner segment 138 is fixedly joined at its distal end to a mounting flange 144 formed on the LP shaft 36. The abutment 142 overlaps the aft mounting flange 122 and engages the aft radial abutment surface 126, thereby retaining the aft end 104 of the platform 88 against radially outward movement due to centrifugal force upon rotation of the rotor disk 42 during engine operation. The abutment 142 also engages the aft abutment surface 126 so as to restrain the platform 88 against movement in the aft direction.

It should be appreciated, however, that the exemplary fan platform 88 and turbofan engine 10 depicted are provided by way of example only. In other exemplary embodiments, the fan platform 88 and turbofan engine 10 may instead have any other suitable configuration. For example, in other exemplary embodiments, the fan platform 88 may be formed of any other suitable materials. Additionally, or alternatively, the fan platform 88 may include one or more other components not discussed herein or depicted in the figures, or alternatively, may not include one or more of the components discussed herein and depicted in figures. Moreover, in still other embodiments, the fan platform 88 may be attached to the turbofan engine 10 in any other suitable manner. For example, the forward and/or aft support rings 128, 130 may alternatively be configured in any other suitable manner.

Referring now particularly to FIGS. 5 and 6, the shell 96 and body 98 together define one or more at least partially enclosed voids. Specifically, the outer body member 114 and outer shell member 118 together define a forward enclosed void 148 and an aft enclosed void 150. As will be discussed below, the fan platform 88 may be assembled and/or manufactured using a resin injection method, such as a resin transfer molding process, in which the fan platform 88 is subjected to increased temperatures and pressures while an amount of resin is added thereto. It should be appreciated, however, that in other embodiments, the fan platform 88 may instead be assembled/manufactured in any other suitable manner. For example, in other embodiments, the fan platform 88 may be assembled/manufactured using a hot compression process. Additionally, although for the embodiment depicted the forward and aft enclosed voids 148, 150 are completely enclosed voids in other exemplary embodiments, the forward and aft enclosed voids 148, 150 may instead be partially enclosed voids such that at least a portion of such voids are exposed.

In order to prevent an amount of resin from filling the forward and aft enclosed voids 148, 150 during the assembly and/or manufacturing of the fan platform 88, when assembled/manufactured using a resin injection method, the fan platform 88 includes a forward insert 152 positioned in the forward enclosed void 148 and an aft insert 154 positioned in the aft enclosed void 150. The forward insert 152 may substantially fill the forward enclosed void 148 and the aft insert 154 may substantially fill the aft enclosed void. Additionally, for the embodiment depicted, the forward and aft inserts 152, 154 are each formed of a closed cell foam material. The closed cell configuration may, e.g., prevent resin from filling an interior of the inserts 152, 154 and resin from filling the respective enclosed voids 148, 150 during assembly/manufacture of the fan platform 88. For example, in certain exemplary embodiments, one or both of the forward or aft inserts 152, 154 may be formed of a closed cell carbon foam material, a closed cell metal foam material, a closed cell plastic foam material, or any suitable closed cell polymer foam material.

As discussed above, the components defining the enclosed voids 148, 150 may be formed different materials. For example, a first component, e.g., the outer shell member 118, may be formed of a first material which may define a first coefficient of thermal expansion. Additionally, a second component, e.g., outer body member 114, may be formed of a second material which may define a second coefficient of thermal expansion. Accordingly, during assembly/manufacture of the fan platform 88, e.g., when the fan platform 88 is subjected to higher temperatures, the outer body member 114 and outer shell member 118 may expand at different rates, such that the inserts 152, 154 may need to be capable of deforming to the changing shape of the enclosed voids 148, 150. Accordingly, the forward and aft inserts 152, 154 may each be formed of a material defining a relatively low Young's modulus (also known as tensile modulus). Specifically, the forward and aft inserts 152, 154 may each be formed of material defining a Young's modulus less than about one twenty-five (125) thousand pounds per square inch (ksi). For example, the forward and aft enclosed voids 148, 150 may each be formed of material defining a Young's modulus less than about one hundred (100) ksi, less than about seventy-five (75) ksi, or less than about sixty (60) ksi. Moreover, the forward and aft inserts 152, 154 may each be formed of a material having an elongation at break greater than about two and a half (2.5) percent. For example, the forward and aft inserts 152, 154 may each be formed of a material having an elongation at break greater than about three (3) percent, such as greater than about four (4) percent, such as greater than about eight (8) percent, such as greater than about ten (10) percent. As used herein, the term "elongation at break" refers to a ratio between a changed length and initial length after breakage of a material. The term elongation at break is a measure of a capability of a material to resist changes in shape without crack formation.

Moreover, it should be appreciated, that as used herein, terms of approximation, such as "about" or "approximately," refer to being within a ten percent margin of error.

A fan platform 88 including a low modulus insert may have an overall reduced internal stress as the insert may not resist, e.g., thermal growth mismatch of the various components of the fan platform 88 during, e.g., assembly/manufacture of the fan platform 88.

Figure 7:
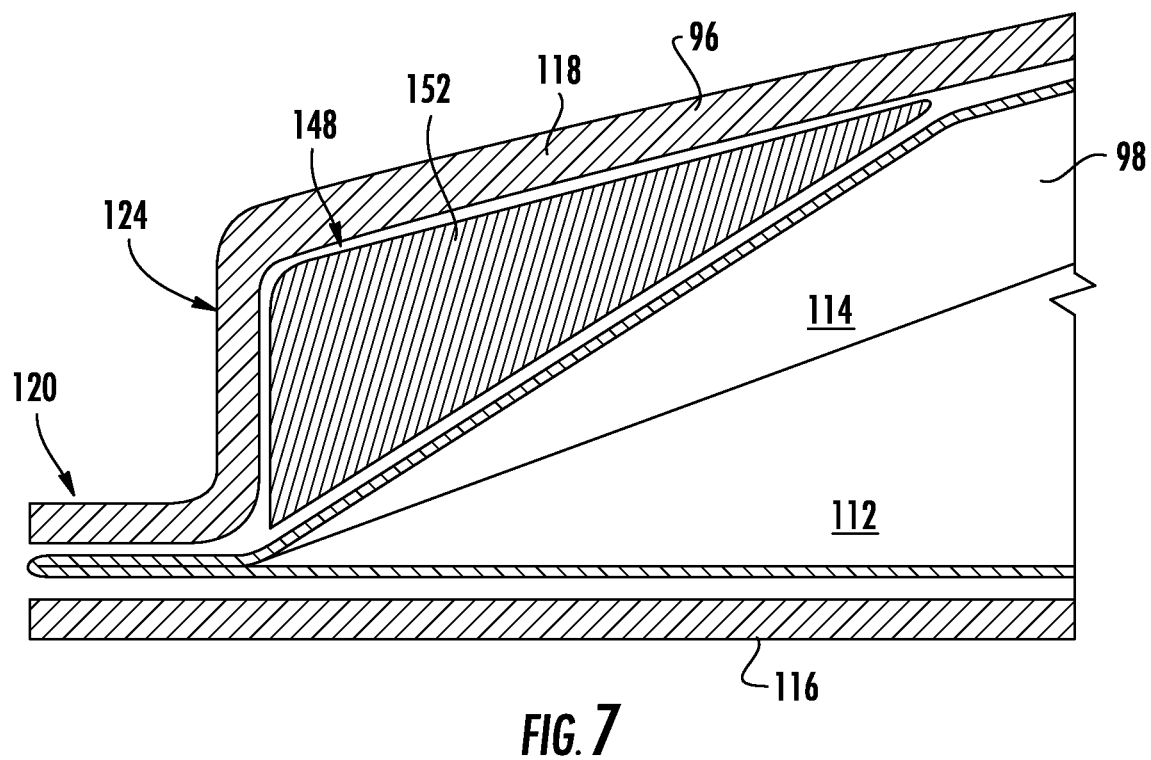
FIG. 7 is a close-up, cross-sectional view of a portion of the exemplary fan platform of FIG. 4.

Additionally, referring now also to FIG. 7, a close-up, cross-sectional view of the forward void 48 and forward insert 152 is provided. Notably, during assembly/manufacture of the fan platform 88, the fan platform 88 may be subjected to increased pressures as part of the resin injection method. Thus, the inserts 152, 154 need to be able to maintain a desired shape under these increased pressures to prevent the resin being injected from filling the voids 148, 150 in which the inserts 152, 154 are positioned. For example, the inserts 152, 154 need to maintain pressed against the interior walls of the various components defining the enclosed voids 148, 150 to prevent resin from filling such voids 148, 150. If resin were to fill a portion of the voids 148, 150, the fan platform 88 may be heavier than desired and/or may cause an imbalance of the fan 38 into which the fan platform 88 is incorporated.

Accordingly, the forward and aft inserts 152, 154 may each be formed of a foam material having a density between about fifteen (15) pounds per cubic feet and about one (1) pound per cubic feet. For example, the forward and aft inserts 152, 154 may each be formed of a material having a density between about thirteen (13) pounds per cubic feet and about four (4) pounds per cubic feet, such as between about twelve (12) pounds per cubic feet and about six (6) pounds per cubic feet.

A fan platform including one or more inserts in accordance with such an exemplary embodiment may prevent resin from filling the forward and/or aft enclosed voids during the resin injection forming process. Additionally, inclusion of one or more inserts in accordance with an exemplary embodiment of the present disclosure into a fan platform may reduce a weight of the fan platform due to the relatively low density of the forward and/or aft inserts.

Figure 8:
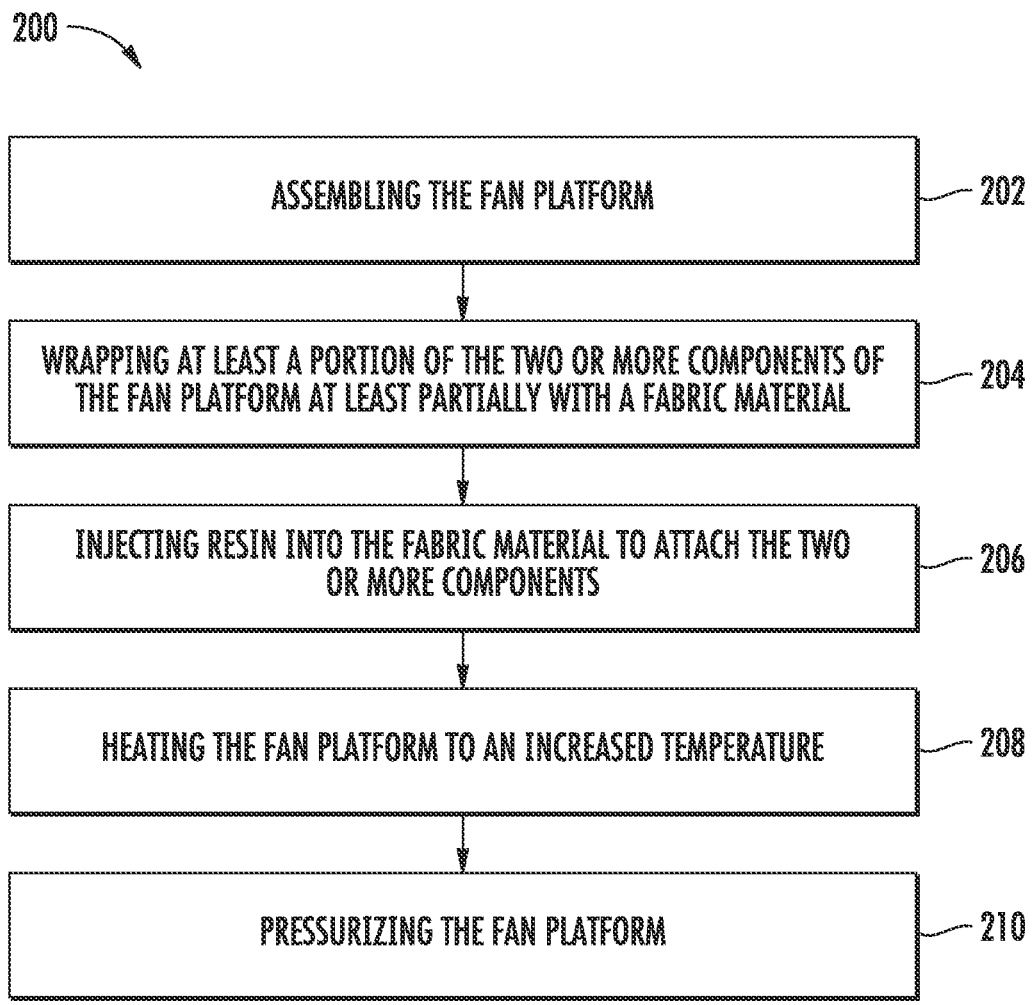
FIG. 8 is a flow diagram of a method for manufacturing a fan platform in accordance with an exemplary aspect of the present disclosure.

Referring now to FIG. 8, a flow diagram is provided of an exemplary method (200) for manufacturing a fan platform in accordance with an exemplary aspect of the present disclosure. For example, the exemplary method (200) may be used to manufacture the exemplary fan platform 88 described above with reference to FIGS. 2 through 7.

The exemplary method (200) includes at (202) assembling the fan platform. Specifically, for the exemplary aspect depicted, assembling the fan platform at (202) includes assembling two or more components of the fan platform to define an enclosed void with an insert positioned therein. The two or more components of the fan platform may be a body portion of the fan platform and a shell portion of the fan platform. The body portion may be positioned within the shell portion with one or more enclosed voids defined therebetween. The insert may be positioned in at least one of the one or more voids. Additionally, the insert may be configured in substantially the same manner as one or both of the exemplary inserts 152, 154 described above with reference to FIGS. 4 through 7. Accordingly, for example, the insert may be formed of a material defining a Young's modulus less than about 125 thousand pounds per square inch.

The exemplary method (200) additionally includes at (204) wrapping at least a portion of the two or more components of the fan platform at least partially with a fabric material. For example, in certain exemplary aspects, wrapping at least a portion of the two more components of the fan platform at least partially with a fabric material at (204) may include wrapping a thin glass fabric mat around the shell of the fan platform. Additionally, the exemplary method (200) includes at (206) injecting resin into the fabric material to attach the two or more components. The resin may be any suitable resin, such as an epoxy. Additionally, in certain exemplary aspects, the fabric wrapped components may be positioned in a mold to inject the suitable resin.

Subsequently, the exemplary method (200) includes at (208) heating the fan platform to an increased temperature and at (210) pressurizing the fan platform. Heating the fan platform at (208) and pressurizing the fan platform at (210) may assist with curing the resin injected into the fabric material. In certain exemplary aspects, heating the fan platform to an increased temperature at (208) may include heating the fan platform to a temperature of at least about one hundred and sixty degrees Fahrenheit (160° F.), such as to a temperature of at least about one hundred and eighty degrees Fahrenheit (180° F.), such as to a temperature of at least about one hundred and ninety degrees Fahrenheit (190° F.), such as to a temperature of at least about two hundred degrees Fahrenheit (200° F.). Additionally, pressurizing the fan platform at (210) may include pressurizing the fan platform to a pressure of at least about two hundred pounds per square inch (psi) (200 psi), such as to a pressure of at least about two hundred and twenty psi (220 psi), such as to a pressure of at least about two hundred and forty psi (240 psi), such as to a pressure of at least about two hundred and fifty psi (250 psi).

Moreover, it should be appreciated, however, that the exemplary method (200) described herein is by way of example only. In other exemplary embodiments, any other suitable resin injection method may be utilized. For example, in other exemplary embodiments, any other suitable resin may be used and any other suitable fabric mat may be used.

After curing, the fan platform may be removed from the mold and a shell of the fan platform can be provided with one or more coats of a high gloss polyurethane paint. Additionally, after the fan platform is painted, any positioning bumpers and/or wear strips may be bonded to the appropriate portions of the fan platform.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine comprising:
   a fan having a plurality of fan blades; and
   a fan platform positioned between adjacent fan blades of the plurality of fan blades, the fan platform defining an outer surface, the outer surface at least partially defining an inner flowpath boundary of the fan, the fan platform comprising
      a first component formed of a first material that defines a first coefficient of thermal expansion;
      a second component formed of a second material that defines a second coefficient of thermal expansion different than the first coefficient of thermal expansion, the first component attached to the second component, at least one of the first component or second component at least partially defining an enclosed void positioned between the first component and the second component, wherein the enclosed void is defined by an interior surface of the first component and an exterior surface of the second component; and
      an insert positioned in the enclosed void, the insert formed of a material defining a Young's modulus less than about 125 thousand pounds per square inch.

2. The gas turbine engine of claim 1, wherein the insert is formed of a closed-cell foam.

3. The gas turbine engine of claim 1, wherein the insert is formed of a material defining an elongation at break greater than about three percent.

4. The gas turbine engine of claim 1, wherein the insert is formed of a foam having a density between about fifteen pounds per cubic feet and about one pound per cubic feet.

5. The gas turbine engine of claim 1, wherein the first component is attached to the second component using a resin injection method.

6. The gas turbine engine of claim 5, wherein the resin injection method is a fabric-wrapped resin injection method.

7. The gas turbine engine of claim 1, wherein the insert is formed of a carbon foam material.

8. The gas turbine engine of claim 1, wherein the enclosed void is a completely enclosed void.

9. The gas turbine engine of claim 1, wherein the enclosed void is defined by both the first component and the second component.

10. A method for manufacturing a fan platform for positioning between adjacent fan blades of a gas turbine engine fan, the method comprising:
    assembling two or more components, including a first component formed of a first material that defines a first coefficient of thermal expansion and a second component formed of a second material that defines a second coefficient of thermal expansion different than the first coefficient of thermal expansion, of the fan platform to define an enclosed void with an insert positioned therein, the insert formed of a material defining a Young's modulus less than about 125 thousand pounds per square inch and the enclosed void being positioned between the first component and the second component, wherein the enclosed void is defined by an interior surface of the first component and an exterior surface of the second component;
    wrapping at least a portion of the two or more components of the fan platform at least partially in a fabric material; and
    resin injecting the fabric material to attach the two or more components.

11. The method of claim 10, further comprising heating the fan platform to a temperature of at least about 160 degrees Fahrenheit; and pressurizing the fan platform to a pressure of at least about 200 pounds per square inch.

12. The method of claim 11, wherein the insert maintains substantially the same shape during the heating of the fan platform and the pressurizing of the fan platform to prevent resin from filling the enclosed void.

13. The method of claim 10, wherein the insert is formed of a foam having a density between about fifteen pounds per cubic feet and about one pound per cubic feet.

14. The method of claim 10, wherein the insert is formed of a carbon foam material.

15. The method of claim 10, wherein the enclosed void is a completely enclosed void.

16. The method of claim 10, wherein the enclosed void is defined by both the first component and the second component.

* * * * *